United States Patent [19]

Langlais et al.

[11] Patent Number: 4,873,425
[45] Date of Patent: Oct. 10, 1989

[54] VANDAL RESISTANT READ/WRITE DEVICE FOR ELECTRONIC MEMORY CARDS

[75] Inventors: Joel Langlais, Verrieres; Maurice Paumard, Velizy, both of

[73] Assignee: Schlumberger Industries, Montrouge, France

[21] Appl. No.: 178,164

[22] Filed: Apr. 6, 1988

[30] Foreign Application Priority Data

Apr. 9, 1987 [FR] France .................................. 87 04992
Oct. 22, 1987 [FR] France .................................. 87 14601

[51] Int. Cl.⁴ .......................................... G06K 13/00
[52] U.S. Cl. ..................................... 235/441; 235/482
[58] Field of Search ......................... 235/441, 483, 485

[56] References Cited

U.S. PATENT DOCUMENTS

4,404,464 9/1983 Moreno ................................. 235/441

Primary Examiner—Harold I. Pitts
Attorney, Agent, or Firm—Sanford J. Asman

[57] ABSTRACT

A device for reading and/or writing electronic memory cards, said device providing protection against acts of vandalism. The card is guided by slideways. The read/write head is disposed in a zone of a card-receiving housing, which zone is separated from the front zone thereof by a vertical partition provided with a slot for enabling the contact tabs of the card to come opposite the read/write head. At least in said separate zone, the housing is free from abutements or walls that impede card displacement, thereby making it difficult to leave a card or a card fragment jammed inside the device to prevent further use thereof. Advantageously, the card is brought into electrical contact with the read/write head by curving the card, thereby making it difficult to damage the electrical contacts of the read/write head.

17 Claims, 11 Drawing Sheets

VANDAL RESISTANT READ/WRITE DEVICE FOR ELECTRONIC MEMORY CARDS

The present invention relates to a vandal-resistant read/write device for electronic memory cards.

BACKGROUND OF THE INVENTION

Electronic memory cards are now well known. Such a card is essentially constituted by a generally rectangular card body having an electronic module implanted therein. The electronics comprises an integrated circuit including at least one memory circuit, together with external electrical contact tabs which are connected to the terminals of the integrated circuit. In order to use such a card, it is inserted into a card-processing machine. The card-processing machine includes processing circuits for making use of information contained in the card memory and for modifying said information, together with a read/write device which provides a temporary electrical connection between the contact tabs on the card and the processing circuits in the machine. This connection serves to supply electrical power to the integrated circuit in the card, to transmit read/write instructions to the card memory, to apply the write voltage and a clock signal, etc.

A read/write device usually comprises a housing having a slot in its front face through which the card is inserted, and which defines an internal guide passage for positioning the card in such a manner that when it is in a processing position, i.e. when it is fully inserted, the contact tabs of the card come into electrical contact with a connector which is mounted in the guide passage. For memory cards in compliance with the ISO standard, the contact tabs are disposed close to a corner of the card body. The connector of the read/write device is thus off-center from the mid-plane of the read/write device.

Several types of read/write device exist. In some of them, when the card is in the processing position, it is only partially inserted into the guide passage, thereby enabling the card to be moved either manually by the user or else by a wheel driven by a motor. The device is then referred to as a "non-swallowing" device. In other read/write devices the card is fully inserted into the guide passage prior to arriving in the processing position, and card displacement in both directions is obtained by a drive motor. With this second type of device, referred to as a "swallowing" device, it is certain that the card user will not move the card while it is being processed. However, if the card displacement means become faulty, the card may remain jammed in the guide passage which is inconvenient for the card owner and damaging for the organization running the read/write device since the device becomes unusable until it has been repaired.

In addition, many users are reticent about having their cards completely swallowed by the read device.

With the first type of read/write device, the risk and fear of the card becoming jammed inside the device do not exist since a portion of the card body always projects from the card reader. However, both types of read/write device may suffer from acts of vandalism seeking to prevent them from operating. One of the most frequent acts of vandalism consists in inserting a fragment only of an authentic card body in the guide passage of the read/write device, said fragment being cut so that its length is slightly less than the length of the guide passage for use with a reader of the first type, and slightly less than the stroke of card displacement for use with a reader of the second type. In either case, users arriving after the act of vandalism has been performed cannot use the read/write device since the card body fragment therein cannot be extracted from the guide passage. This requires a maintenance team to be called and prevents the read/write device from operating for a non-negligible period of time.

Another form of vandalism consists in spoiling the electrical contacts of the read/write head of the device. This can easily be done by inserting a metal blade or similar object into the card insertion slot instead of a card, and then using the blade to break or deform the electrical contacts. As a general rule these contacts project into the guide passage.

An object of the invention is to provide a read/write device for electronic memory cards which serves to prevent these acts of vandalism, or at least to make them more difficult.

SUMMARY OF THE INVENTION

In order to achieve this object, the invention provides a read/write device for electronic memory cards comprising a card body with electrical contact tabs disposed in one of the main faces of said card body, said device comprising:

a housing provided with a front opening for enabling said card to be inserted into said housing; a read/write head including electrical connection components disposed inside said housing; guidance means for guiding said card between said front opening and a processing position in which said contact tabs are suitably placed for coming into contact with said connection components of said read/write head; and means for maintaining the portion of said card body including said contact tabs in position while said card is in the processing position, whereby said contact tabs are applied against said connection components of the red/write head; at least that region of the housing in which said read/write head is disposed being unobstructed at least at the bottom thereof.

In a first embodiment, the read/write device in accordance with the invention comprises a housing provided with a front opening for insertion of said card, and guide means for guiding said card in translation to a processing position where said contact tabs are suitably placed to come into contact with connection elements of a read/write head, the dimension of said front opening in the card thickness direction being substantially greater than said thickness, said housing also including a partition provided with a slot to allow the card to pass, said partition separating said housing into a first region communicating with said front opening and a second region which does not communicate with said opening, said housing in said second region having no end or other mechanical abutment for said card in the direction of card insertion, and said read/write head is disposed in said second region.

In a particular embodiment of the first implementation, the read/write device includes means for communicating relative motion between said housing and said read/write head between a first position in which said read/write head is not suitably placed for coming into contact with said card, and a second position in which said read/write head is suitably placed for coming into contact with said card, said displacement means being controlled to bring said head into said second position only when said card is in the processing position.

In a second implementation, the read/write device in accordance with the invention comprises a housing fitted with a front opening for insertion of said card and guide means for guiding said card in translation to a processing position in which said contact tabs are suitably placed for coming into contact with the connection components of a read/write head, and it is characterized in that said guide means include means for causing the portion of the card body including said electrical contact tabs to be curved, whereby said contact tabs are pressed against the connection components of said read/write head when said card is in the read position.

BRIEF DESCRIPTION OF THE DRAWINGS

Embodiments of the invention are described by way of example with reference to the accompanying drawings, in which:

FIG. 7d is a detailed view of FIG. 7a; and

MORE DETAILED DESCRIPTION

In the following description, the term "card reader" designates a device for reading and/or writing electronic memory cards.

Figure 1:
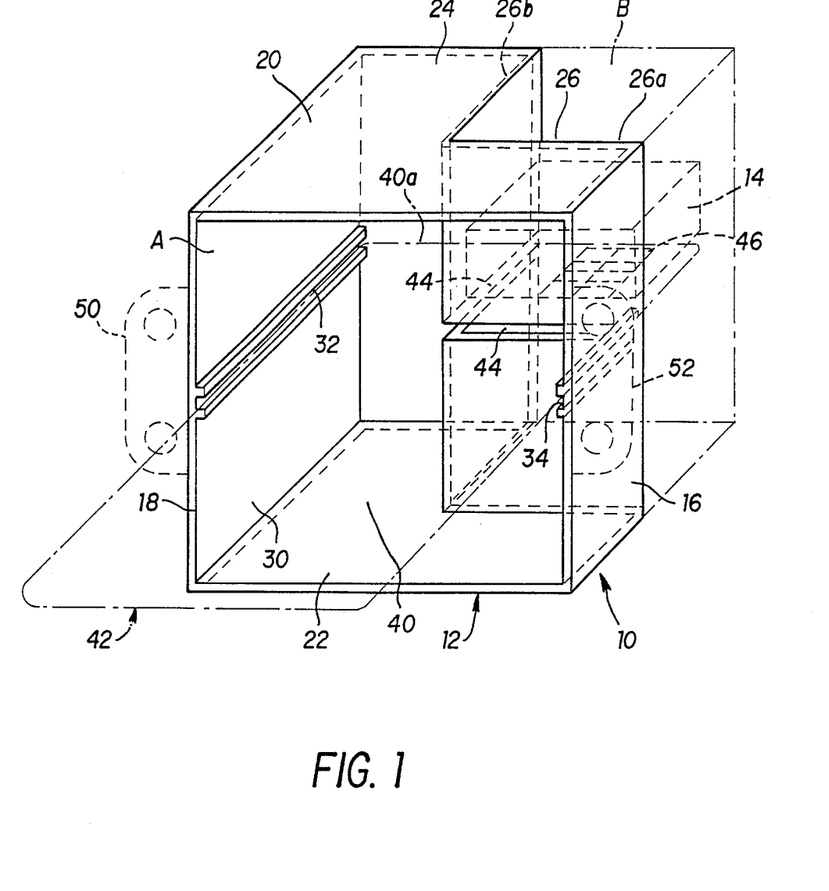
FIG. 1 is a perspective view of a first embodiment of the read/write device.

FIG. 1 shows the general structure of a card reader 10 in accordance with the invention. The reader 10 comprises a housing 12 and a read/write head 14 shown diagrammatically in dashed lines in FIG. 1. The housing 12 comprises two side walls 16 and 18 which are shown vertically in FIG. 1, a top wall 20, a bottom wall 22, and a back wall 24. The housing 12 also includes a partition 26 which is vertical in FIG. 1 and which extends between the top wall 20 and the bottom wall 22. The partition 26 is L-shaped in horizontal section. The partition 26 thus comprises two half-partitions: 26a connected to side wall 16; and 26b connected to back wall 24. The front edges of walls 16, 18, 20, and 22 delimit a front opening 30 which is rectangular in shape.

The partition 26 separates the inside of the housing 12 into two regions: a front region A which extends the front opening 30 and a back region B which is not in communication with the opening 30. As can be seen in FIG. 1, the side wall 16 and the back wall 24 do not extend beyond the partition 26. The same is true of the top and bottom walls 24 and 22. Thus, the region B is delimited solely by the partitions 26a and 26b. The surfaces which would be occupied by the walls 24 and 16 around the region B are indicated by "ghost" extensions in the form of dot-dashed lines.

Returning to region A, it can be seen that the inside faces of side walls 16 and 18 are provided with slideways 32 and 34 which are disposed in the same horizontal plane. As shown in FIG. 1, the slideways 32 and 34 serve as horizontal guides for the body 40 of an electronic memory card 42. Partitions 26a and 26b are provided with a horizontal slot 44 which is disposed in the horizontal plane defined by the slideways 32 and 34. The slot 44 is slightly taller than the thickness e of the card body. As is well known, the card is provided with electrical contact tabs 46. There are eight of them in FIG. 1. The contact tabs 46 are disposed in one of the "corners" of the body of the card 40. The read head which is described in greater detail below is located in region B.

Finally, the housing 12 includes two lugs 50 and 52 for fixing the housing 12 in the machine incorporating the reader.

When the user seeks to use the machine as fitted with card reader 10, the card 42 is inserted into the slideways 32 and 34 via the front opening 30, with the contact tabs 46 being disposed at the leading end and in the top face of the card body 40. The user pushes the card 42 which is guided by the slideways 32 and 34. The front righthand end of the card body penetrates into the slot 44 through the partition 26. The card is pushed until its front edge 40a comes into abutment against the back wall 24. In this situation, the card is in the processing position.

It should be observed that the portion of the card body which includes the electrical contact tabs is situated in region B of the housing which also contains the read head. This portion is held in position in the vertical direction by the lips of the slot 44. It is advantageous to provide for the half-partitions 26a and 26b to be close to the edges of the electrical contact tabs in order to provide improved support.

It can be seen from examining FIG. 1 that the reader is not sensitive to those acts of vandalism which consists in inserting an object in the reader to prevent subsequent insertion of a memory card. Any object which includes a portion situated in the front region A can easily be extracted from the reader by the user since there is sufficient space between the top and bottom walls 20 and 22 to enable an object to be extracted. If an attempt is made to insert an object in region B, it will probably fall away harmlessly, and even if the object is held up, e.g. by the lips of the slot, it will automatically be ejected when a normal card is inserted since region B has no end or mechanical abutment in the direction of card insertion.

Figure 2A:
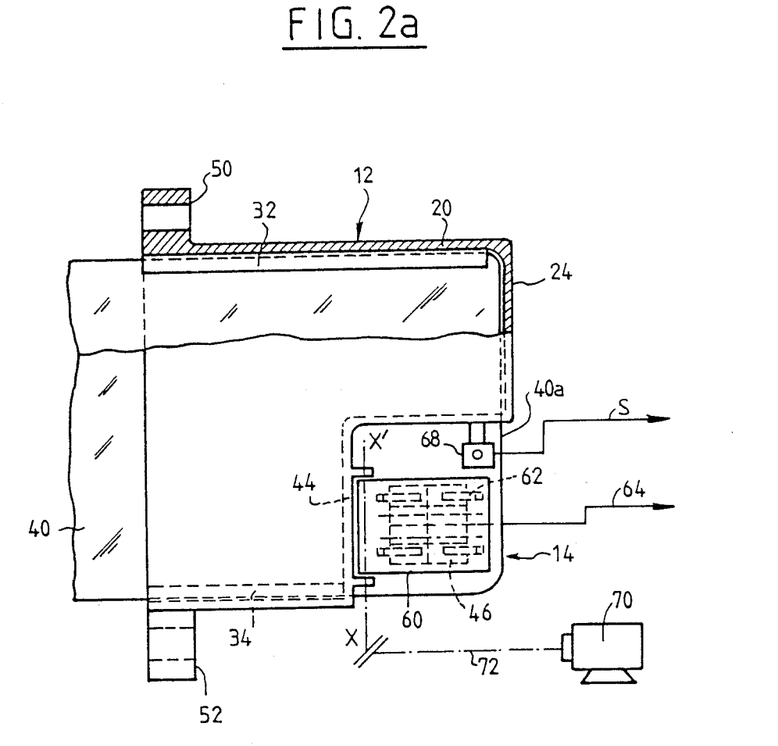
FIGS. 2a and 2b are partially cut-away views of a first embodiment of the FIG. 1 device as seen respectively from above and from the right.
Figure 2B:
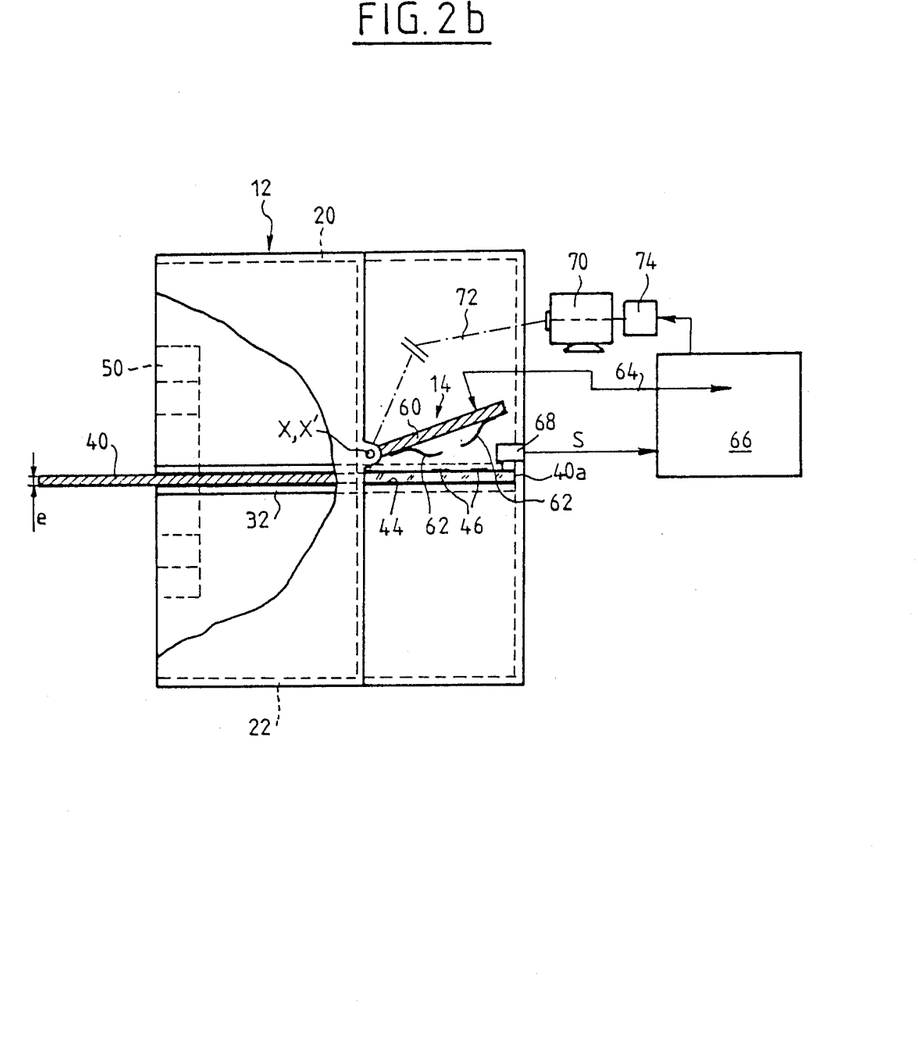

FIGS. 2a and 2b show the FIG. 1 card reader and they show the structure of the read head 14 located in the back region B of the housing 12 in greater detail. The read head 14 is constituted by an insulating support 60 having resilient electrically conductive blades such as 62 mounted thereon. There are the same number of blades 62 as there are electrical contact tabs 46, and the free ends of the blades have the same relative dispositions as the contact tabs. Conductive tracks (not shown)

are formed on the insulating support 60 and provide an electrical connection 64 between each conducting blade 62 and the processing unit 66. The support 60 is mounted to pivot about an axis XX' relative to the housing 12. The card reader also includes a card detector 68 which delivers a signal S when a card 42 arrives in the processing position. The detector 68 does not include any form of mechanical abutment. Rotation of the support 60 is under the control of a motor 70 via a mechanical transmission 72.

In the absence of a signal S delivered by the detector 68, the support 60 is in its raised position as shown in FIG. 2b. When the processing circuit 66 receives the signal S, indicating that a card is present in the processing position, it sends a signal to the control circuit 74 of the motor 70. The motor 70 causes the support 60 to be lowered until its flexible contact blades 62 come into contact with the contact tabs 46 of the card. The processing unit 66 can then interchange signals with the integrated circuit of the card via the contact tabs 46. When the card is extracted, the motor 70 causes the opposite movement to take place, and the support 60 returns to its raised position.

It will be understood that this embodiment has the additional advantage of protecting the contacts 62 of the read head. Because of the normally-raised position of the read head, it is impossible, or at least very difficult, to insert an object via the slot 44 and then damage the contact blades 62.

Figure 4A:
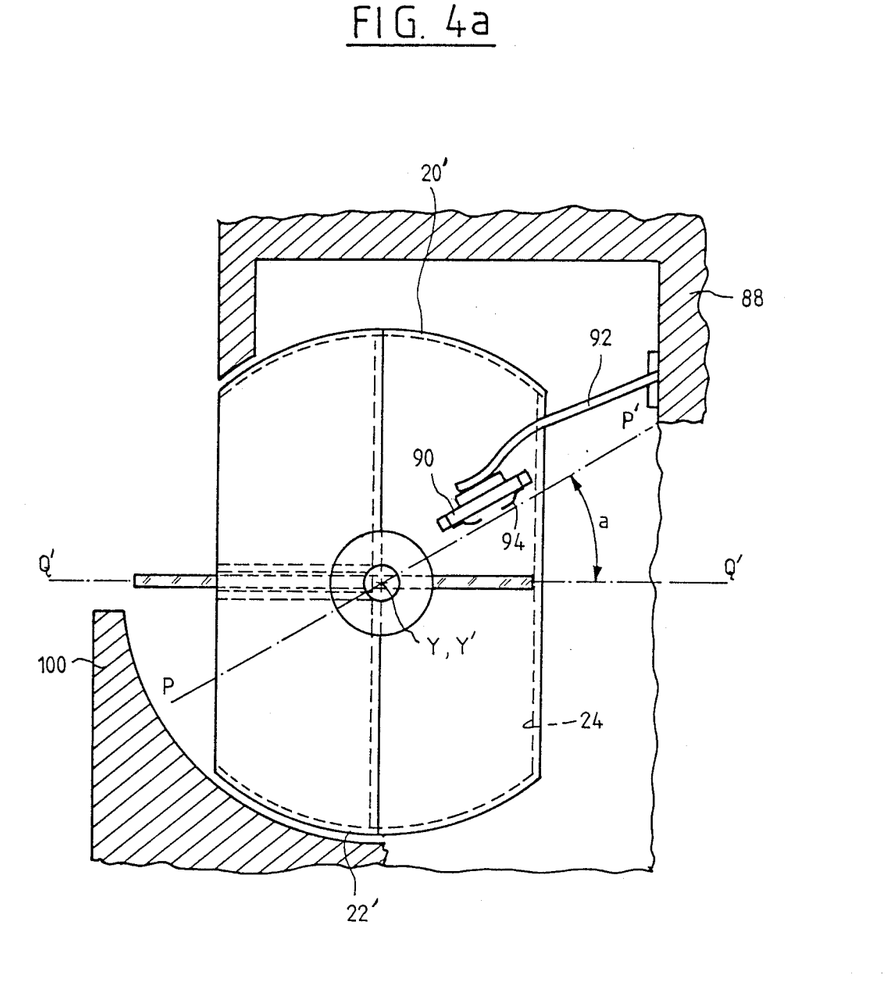
FIGS. 4a and 4b are respectively a righthand view and a plan view of a second embodiment of the read/write device.
Figure 4B:
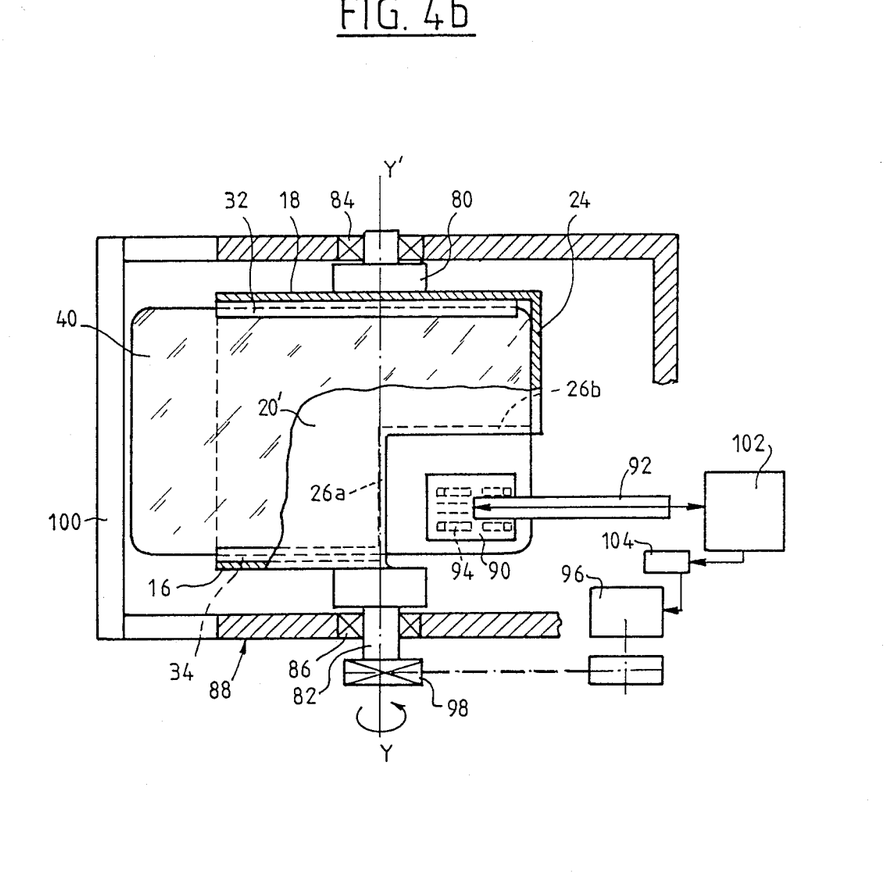

FIGS. 4a and 4b show a second embodiment of the card reader. This embodiment has all the advantages of the embodiment shown in FIGS. 2a and 2b. The essential difference lies in the fact that instead of the housing being stationary and the read head moving, it is the housing and thus the card which moves while the read head remains stationary and fixed to a support.

The housing 12' of the card reader is identical to the housing 12 of FIG. 1 except that the top and bottom walls 20' and 22' are portions of cylindrical surfaces about an axis Y,Y'.

The outside faces of the side walls 16 and 18 are provided with shafts 80 and 82 which are mounted to pivot in thrust bearings 84 and 86 fixed to a stationary support part 88. The shafts 80 and 82 lie on geometrical axis Y,Y'. The thrust bearings 84 and 86 prevent the housing 10 from moving in translation along the direction Y,Y'. The read head 90 is fixed to the end of a stationary arm 92 which is itself fixed to the support part 88. The read head 90 is supported in such a manner that the mean plane P,P' of its electrical contact blades 94 is at an angle a with the card insertion plane Q,Q' as defined by the slideways 32 and 34 when the housing 10 is at rest. Rotation of the housing 10 about the axis Y,Y' is under the control of a motor 96 which is drivingly connected to a pulley 98 fixed to shaft 92. Finally, the support part 88 includes a shutter-forming portion 100. So long as the housing 10 is at rest (FIG. 4a) the shutter 100 closes only the bottom portion of the front opening 18 to the housing. The card 42 can thus be inserted in the slideways 32 and 34. When the card comes into abutment with the back wall 24, the processing circuit 102 sends a signal to the control circuit 104 and the motor 96 causes the housing 10 to rotate about the axis Y,Y' until the plane Q,Q' coincides with the plane P,P'. In this position, the contact tabs 46 of the card are in electrical contact with the contacts 94 of the read head 90. In addition, it is impossible to extract the card from the housing by virtue of the presence of the shutter 100.

Figure 3:
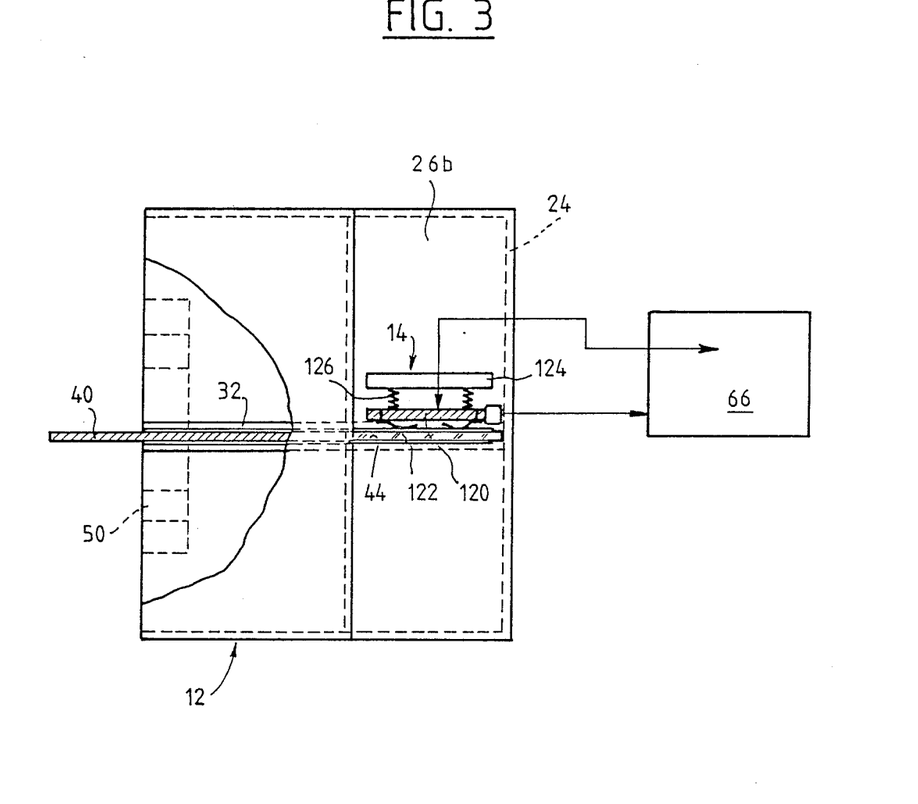
FIG. 3 is a partially cut-away righthand view of a second embodiment of the FIG. 1 device.

FIG. 3 shows a simplified version of the card reader. The housing 12 is completely identical with that shown in FIGS. 1 and 2a, 2b, the difference lies in the read head 14 which is substantially stationary. The read head comprises an insulating support 120 having electrically conductive resilient blades 122 fixed thereto. The support 120 is connected to a support arm 124 which is fixed to the housing 12 by a resilient system 126. When the card is in the processing position, the pressure between the resilient blades 122 and the contact tabs 48 is sufficient to ensure good electrical connection between the card and the card reader.

Figure 5:
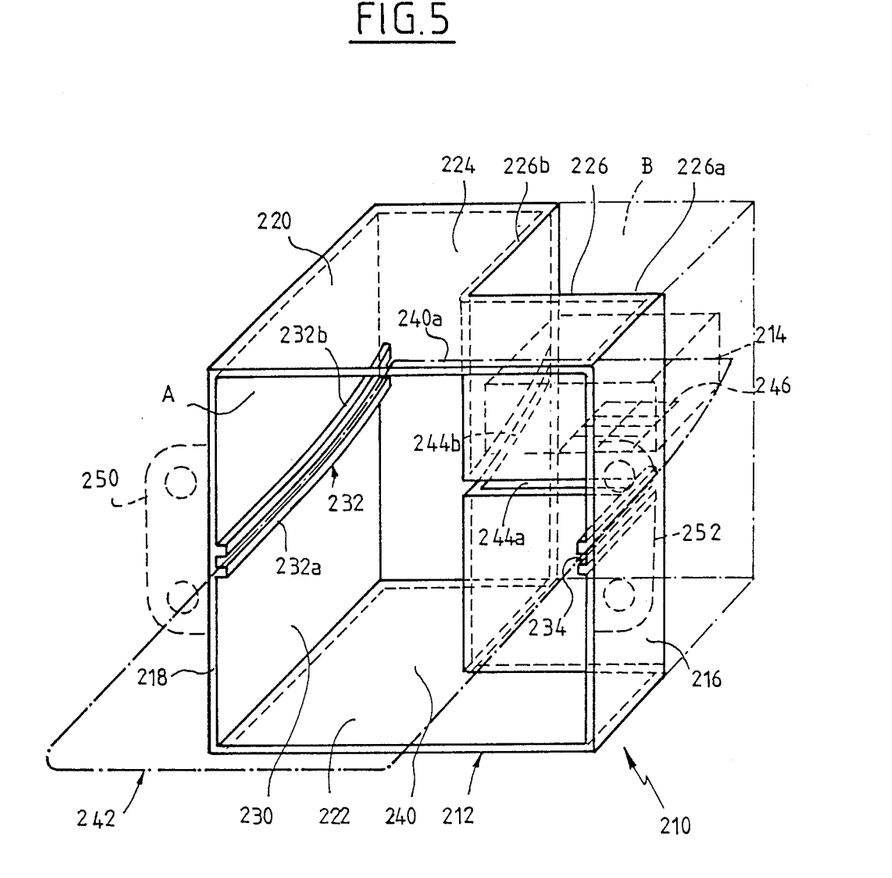
FIG. 5 is a perspective view of a third embodiment of the read/write device.

FIG. 5 shows the general structure of a card reader 210 in accordance with a third embodiment of the invention. The reader 210 comprises a housing 212 and a read/write head 214 shown diagrammatically in dashed lines in FIG. 5. The housing 212 comprises two side walls 216 and 218 which are shown vertically in FIG. 5, a top wall 220, a bottom wall 222, and a back wall 224. The housing 212 also includes a partition 226 which is vertical in FIG. 5 and which extends from the top wall 220 to the bottom wall 222. The horizontal section of the partition 226 is L-shaped. The partition 226 thus comprises two half-partitions: 226a connected to side wall 216; and 226b connected to back wall 224. The front edges of the walls 216, 218, 220, and 222 delimit a front opening 230 which is rectangular in shape.

The partition 226 separates the inside of the housing 212 into two regions: a front region A which extends the front opening 230 and a back region B which is not in communication with the opening 230. As can be seen in FIG. 5, the side wall 216 and the back wall 224 do not extend beyond the partition 226. The same is true of the top and bottom walls 224 and 222. As a result, region B is delimited solely by the partitions 226a and 226b. "Ghost" extensions of the walls 224 and 216 in region B are shown by dot-dashed lines.

Returning to region A, it can be seen that the inside faces of the side walls 216 and 218 are provided with slideways 232 and 234. Slideway 234 and the front portion 232a of slideway 232 are disposed in the same horizontal plane. However, the back portion 232b of slideway 232 is curved away from the bottom wall 222 as it goes towards the back wall 224. As can be seen in FIG. 5, the slideways 232 and 232 serve to guide the body 240 of an electronic memory card 242. The partitions 226a and 226b are provided with a slot 244. Portion 244a of the slot 224 in partition 226a is horizontal and lies in the same plane as the slideway 234 and front portion 232a of slideway 232. Portion 244b of the slot 244 provided in partition 226b is curved to have the same curvature as back portion 232b of the slideway 232. Thus, the rear slideway portion 232b and the slot 244b define a portion of a cylindrical surface about a horizontal axis. The slot 244 is slightly taller than the thickness e of the card body. As is well known, the card is provided with electrical contact tabs 246. There are eight of them in FIG. 1. The contact tabs 246 are disposed in a "corner" of the card body 240. The read head 214 as described in greater detail below is disposed in region B. Finally, the housing 212 includes two lugs 250 and 252 for fixing the housing 212 to the machine in which the reader is incorporated.

When a user seeks to use a machine fitted with card reader 210, the card 242 is inserted in the slideways 232 and 234 via the front opening 230, with the contact tabs 246 being disposed near the leading edge and in the top face of the card body 240. The user pushes the card 242 which is guided by the slideways 232 and 234. The righthand end of the card body passes through the slot 244 in the partition 226. The card is pushed until its front edge 240a abuts against the back wall 224. In this situation, the card is in the processing position.

When the front end of the card body 240 engages the curved portion 232b of slideway 232 and the curved slot 244b, these two guide components cause the leading end of the card body, i.e. the portion containing the contact tabs 246, to be curved. This curvature tends to press the contact tabs 246 against the read head 214 and to stiffen this portion of the card, thereby further improving the quality of the electrical contact between the card and the read/write head.

It should be observed that the portion of the card which includes the electrical contact tabs is situated in the region B of the housing which contains the read head. This portion of the card is firmly held in position in the vertical direction by the lips of the slot 244. It is advantageous to place the half-partitions 226a and 226b as close as possible to the periphery of the electrical contact tabs in order to hold them better.

FIG. 5 shows that the reader is insensitive to those acts of vandalism which consists in inserting an object in the reader in order to prevent subsequent insertion of a memory card. An object leaving a portion situated in the front region A can easily be extracted from the reader by the user since the distance between the top wall 220 and the bottom wall 222 is sufficient to enable an object to be extracted. If an attempt is made to insert an object into the region B, this object will either fall away harmlessly or else it will be automatically ejected when a normal card is inserted since region B does not have a back or any other mechanical abutment in the direction of card insertion.

Figure 6A:
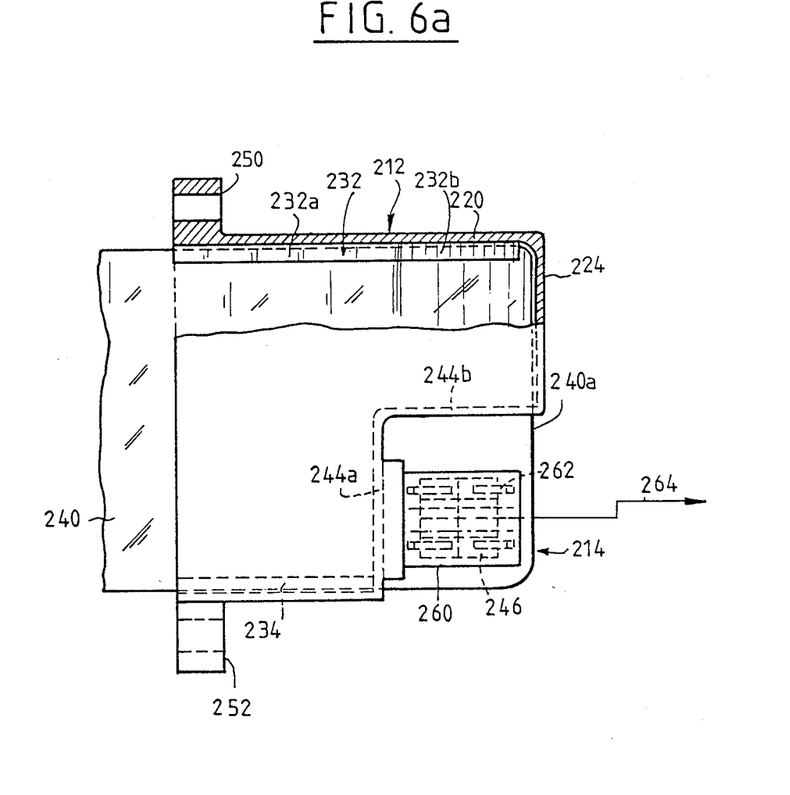
FIGS. 6a and 6b are partially cut-away views of the FIG. 5 third embodiment of the device as seen respectively from above and from the righthand side.
Figure 6B:
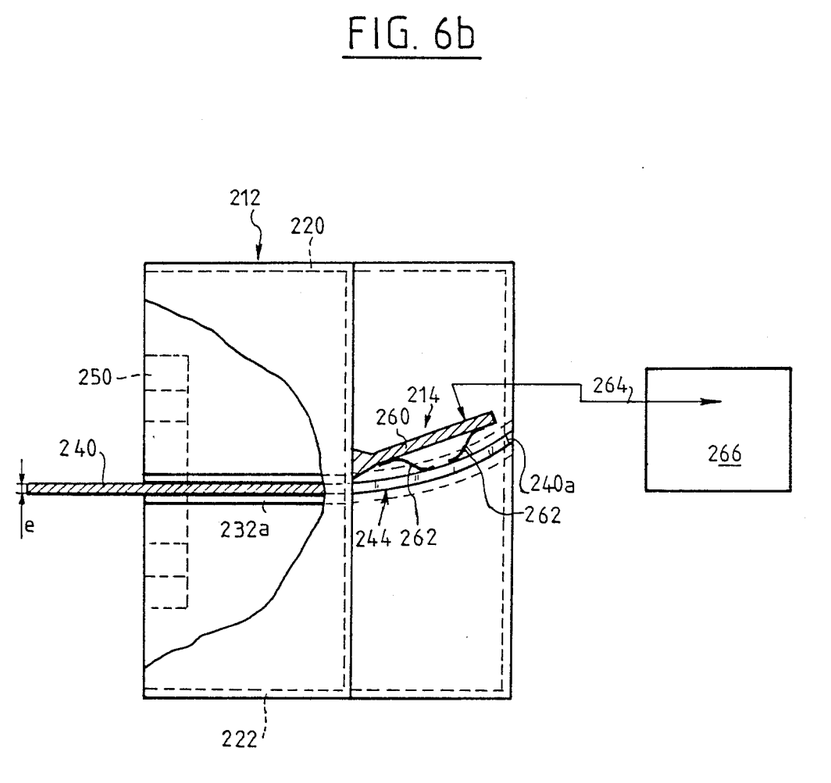

FIGS. 6a and 6b show the FIG. 5 card reader and they give greater detail concerning the structure of the read head 214 which is disposed in the back region B of the housing 212. The read head 214 is constituted by an insulating support 260 having electrically conductive resilient blades such as 262 mounted thereon. There are the same number of blades 262 as there are electrical contact tabs 246 and the three ends of the blades have the same physical disposition as the contact tabs. Electrically conductive tracks (not shown) are provided on the insulating support 260 in order to provide an electrical connection 264 between each conducting blade 262 and the processing unit 266. The support 260 is at a slope to the horizontal so as to be substantially parallel to the portion of the card body 244 carrying the contact tabs 246. It will be understood that this embodiment has the additional advantage of protecting the contacts 262 of the read head. Since the read head is in a sloping position behind the partition 226, it is impossible, or at least very difficult, to insert an object through the slot 244 in order to damage the contact blades 262.

Figure 7A:
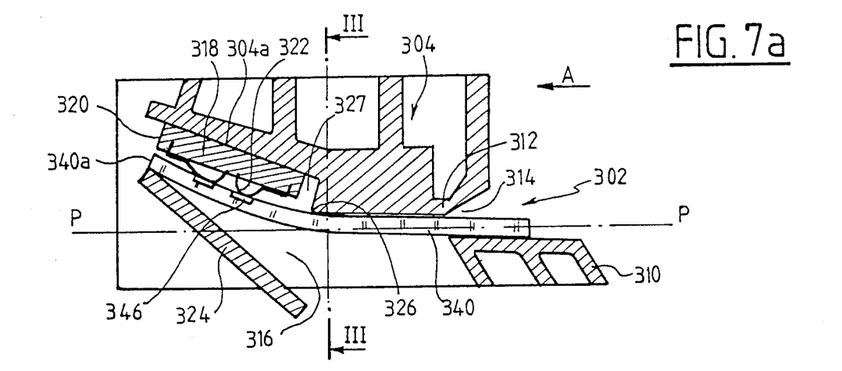
FIG. 7a is a longitudinal section on a plane A—A of FIG. 7b of a fourth embodiment of the read/write device.
Figure 7B:
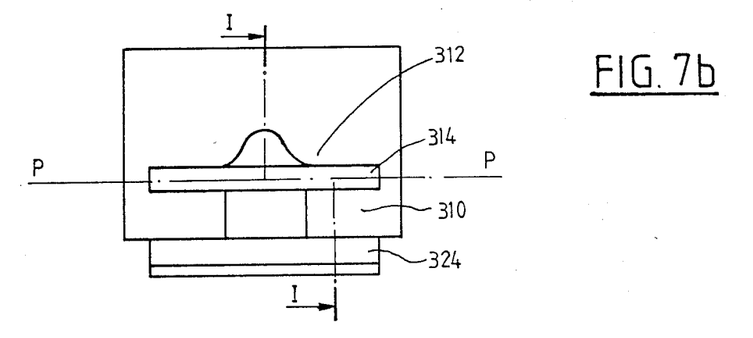
FIG. 7b is a front view of the FIG. 7a read/write device.
Figure 7C:
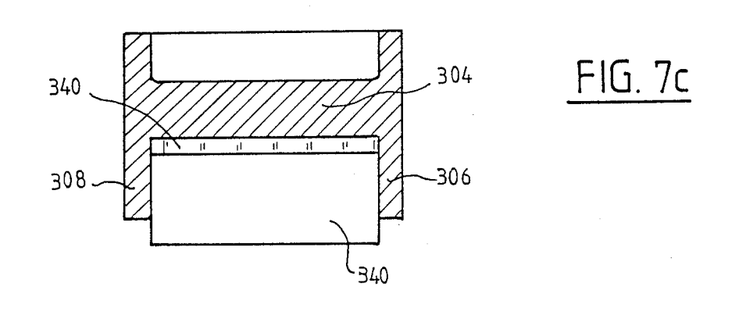
FIG. 7c is a vertical section view on a line C—C of FIG. 7a through the fourth embodiment of the read/write device.
Figure 7D:
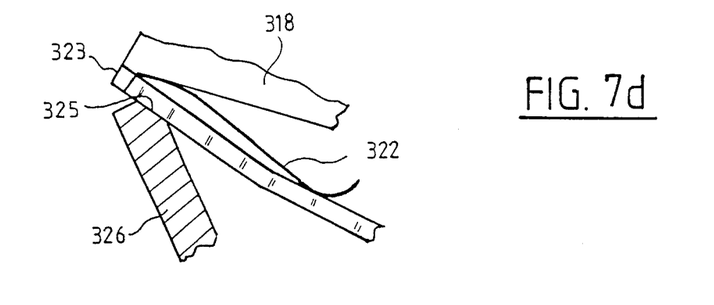

FIGS. 7a and 7d show a fourth embodiment of the card reader. It comprises a housing 302 consituted by a top partition 304, two side partitions 306 and 308, and a bottom partition 310. The two side partitions 306 and 308 are separated by a distance which is substantially equal to the width of a card body. The top face 310a of the bottom partition 310 and the front portion 312 of the top partition 304 define a slot 314 between the side partitions for card insertion. The slot 314 enables a card to be inserted into the cavity 316 defined by the housing, said cavity 316 having no bottom wall.

On the sloping internal face 304a of partition 304 there is a read head 318 identical to that shown in FIGS. 6a and 6b. FIG. 7a only shows the insulating support 320 and the conductive blades 322 of the read head together with a mechanical stop 323 which is more clearly visible in FIG. 7d. Facing the read head 318, the cavity 316 includes a substantially plane inclined partition 324 whose edges are fixed to the side partitions 306 and 308 of the housing. Partition 324 slopes at a steeper angle than the read head 308. Partition 316 is preferably terminated by a chamfer edge 325 at a smaller slope than the main face of partition 326, as shown in FIG. 7d.

When a user inserts a card 340 in slot 314, the card penetrates into the cavity 316 and is guided by the side walls 306 and 308 and by the bottom partition portion 310. When the leading edge 340a of the card body comes into contact with the sloping partition 324, the slope of the partition is such that as the user continues to push the card, the card body continues to advance in the cavity 316 and becomes curved relative to the horizontal plane P—P along which the card is inserted, as shown in FIG. 7a. The card continues to advance until its leading edge 340a comes into abutment with the mechanical abutment 323.

The curvature of the card body is controlled by a plane bearing surface 326 leaving a set-back portion 327 in the cavity 316 beyond the top partition 304. In this position, the contact tabs 346 of the card are connected to the conducting blades 322 of the read head.

It should be underlined that the chamfer 325 enables the user to "feel" that the card is about to come into abutment with the mechanical abutment 323.

Figure 8A:
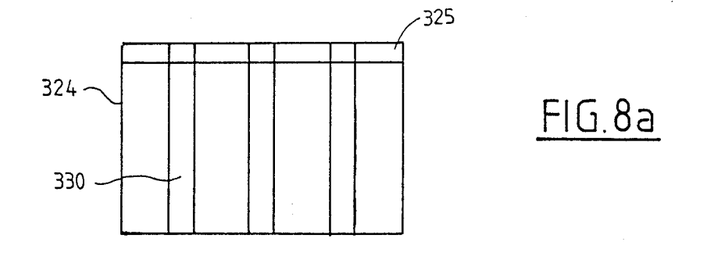
FIGS. 8a and 8b show a variant of the reader embodiment shown in FIGS. 7a to 7d, respectively as a front view and as a section of line IV—IV.
Figure 8B:
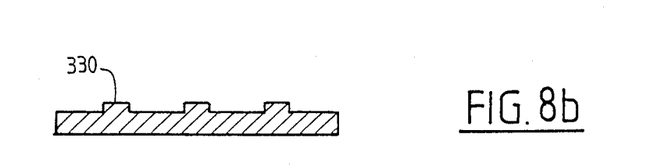

In the variant embodiment shown in FIGS. 8a and 8b, the face of the partition 324 on which the leading edge 340a of the card rubs is still substantially plane, but it has ribs 330 disposed in the card insertion direction and which projects very slightly from the main face of the partition 324. It can thus be understood that if an object is inserted for vandalistic purposes into the card reader in order to attempt to damage the contact blades, the object can be moved very little in a direction perpendicular to the insertion direction, and the amplitude of such movement is limited by the distance between two consecutive ribs 330. It is thus more difficult to damage the contacts.

Also, it is clear that it is not essential for the partition 324 to occupy the entire width of the cavity 316 and it suffices for the partition to be wide enough to guide the end of the card body and to curve it the required amount. The partition 324 could also consist in a plurality of parallel partition bars separated by gaps, with the partition bars all lying in the same plane.

The curvature taken up by the front portion of the card body performs several functions. Firstly it stiffens the portion of the card body which is in contact with the read head, thereby ensuring good electrical contact between the card and the read head even though the card is not pressed against a partition in the portion thereof which carries the contact tabs. Further, as it deforms, the card presses against the contacts of the connector, with the friction stroke being very small but sufficient to ensure that the contacts are automatically cleaned, by virtue of the steep slope of the partition 324, which is about 36°. Similarly considerations apply to the embodiments of FIGS. 5 and 6. Further, this curvature ensures that the card is held suitably still during the processing thereof.

The card reader provides effective protection against acts of vandalism. Since there is no bottom to the cavity 316, objects inserted therein to jam the reader fall away. Further, the read head 318 is disposed behind the top portion 326 in the set-back portion 327, thereby making it impossible, or at least very difficult, to insert a rigid object through the slot 314 for the purpose of damaging the conductive blades of the read head 318.

We claim:

1. A read/write device for electronic memory cards comprising a card body with electrical contact tabs disposed in one of the main faces of said card body, said device comprising:
   a housing provided with a front opening for enabling said card to be inserted into said housing;
   a read/write head including electrical connection components disposed inside said housing;
   guidance means for guiding said card between said front opening and a processing position in which said contact tabs are suitably placed for coming into contact with said connection components of said read/write head; and
   means for maintaining the portion of said card body including said contact tabs in position while said card is in the processing position, whereby said contact tabs are applied against said connection components of the read/write head; at least that region of the housing in which said read/write head is disposed being unobstructed at least at the bottom thereof.

2. A read/write device for electronic memory cards comprising a card body having electrical contact tabs disposed in one of the main faces of said card body said device comprising:
   a housing provided with a front opening to enable said card to be inserted into said body, said opening having dimensions in the thickness direction of the card which are considerably greater than the thickness of said card;
   a read/write head including connection components disposed inside said body;
   guidance means for guiding said card between said front opening and a processing position in which said contact tabs are suitably placed to come into contact with said connection components on said read/write head; and
   means for holding the portion of said card body including said contact tabs in position when said card is in the processing position, said holding means comprising a partition provided with a card-passing slot, said partition separating said housing into a first region which communicates with said front opening and a second region which does not communicate with said front opening and which contains said read/write head, said housing lacking, in said second region, a back or a mechanical abutment for preventing displacement of the card in the card-insertion direction.

3. A read/write device according to claim 2, wherein said first region of the housing includes means constituting a mechanical abutment for said card in the card-insertion direction.

4. A read/write device according to claim 2, wherein said partition is shaped so that substantially only that portion of the card body including said electrical contact tabs is disposed in said second region when said card is in the processing position.

5. A read/write device according to claim 2, wherein the dimensions of said slot in the card thickness direction are substantially equal to said thickness.

6. A read/write device according to claim 2, wherein said first region of the housing is delimited by two side walls extending along the card insertion direction, by a back wall extending substantially perpendicularly to the card insertion direction, and by said partition, and in which said guide means comprise two slideways, each slideway being fixed to a corresponding one of the side walls, said slot in the partition being disposed in the plane defined by said slideways.

7. A read/write device according to claim 2, wherein said second region of the housing is delimited solely by said partition.

8. A read/write device according to claim 2, further including means for imparting relative motion between said housing and said read/write head between a first position in which said read/write head is not suitably placed for coming into contact with said card and a second position in which said read/write head is suitably placed for coming into contact with said card, said displacement means being controlled to bring said head into said second position only when said card is in the processing position.

9. A read/write device according to claim 8, wherein said housing is stationary and said read/write head is movable.

10. A read/write device according to claim 7, wherein said read/write head is stationary and said housing is mounted to pivot about a fixed support between a first position in which said card engaged in said housing is not in contact with said read/write head and a second position in which said card is in contact with said read/write head.

11. A read/write device according to claim 10, wherein said support includes a component which at least partially closes said front opening when said housing is in said second position.

12. A read/write device according to claim 2, wherein said holding means include means for curving that portion of the card body which carries the electrical contact tabs, whereby said contact tabs are applied against the connection components of said read/write head when said card is in the processing position.

13. A read/write device according to claim 12, wherein said means for imposing curvature to said card body comprise a curved portion of slideway and a portion of said slot which is also curved and which is disposed substantially along the card-insertion direction, said curved portions of slideway and slot defining a portion of a cylindrical surface about an axis which is orthogonal to the card-insertion direction.

14. A read/write device for electronic memory cards comprising a card body and electrical contact tabs disposed in one of the main faces of said card body, said device comprising:
   a housing provided with a front opening for enabling said cards to be inserted into said housing;
   a read/write head including electrical connection components disposed inside said housing;
   guidance means for guiding said card between said front opening and a processing position in which said contact tabs are suitably placed for coming into contact with said electrical connection components of said read/write head; and
   holding means for holding that portion of said card body which includes said contact tabs when said card is in the processing position, said holding means comprising curving means for causing that portion of the card body which includes said electrical contact tabs to curve, whereby said contact tabs are applied against the electrical connection components of said read/write head when said card is in the processing position, said housing having no bottom.

15. A read/write device according to claim 14, wherein said curving means comprise a substantially plane partition at a slope relative to the direction of card insertion and disposed substantially facing the read/write head, with the distance in the card-insertion direction between said front opening and said partition being less than the dimension of said card along said direction.

16. A read/write device according to claim 14, wherein said front opening is in the form of a slot whose height is substantially equal to the thickness of the card body, and wherein said housing defines an internal cavity having no bottom in which said inclined partition is disposed together with another partition component against which the face of the card body including the contact tabs is applied when said card body is subjected to said curvature.

17. A read/write device according to claim 15, wherein said sloping partition includes at least one rib running along the card-insertion direction.

* * * * *